Sept. 24, 1935.  A. B. WELTY  2,015,575
HARVESTER
Filed June 29, 1934   2 Sheets-Sheet 2
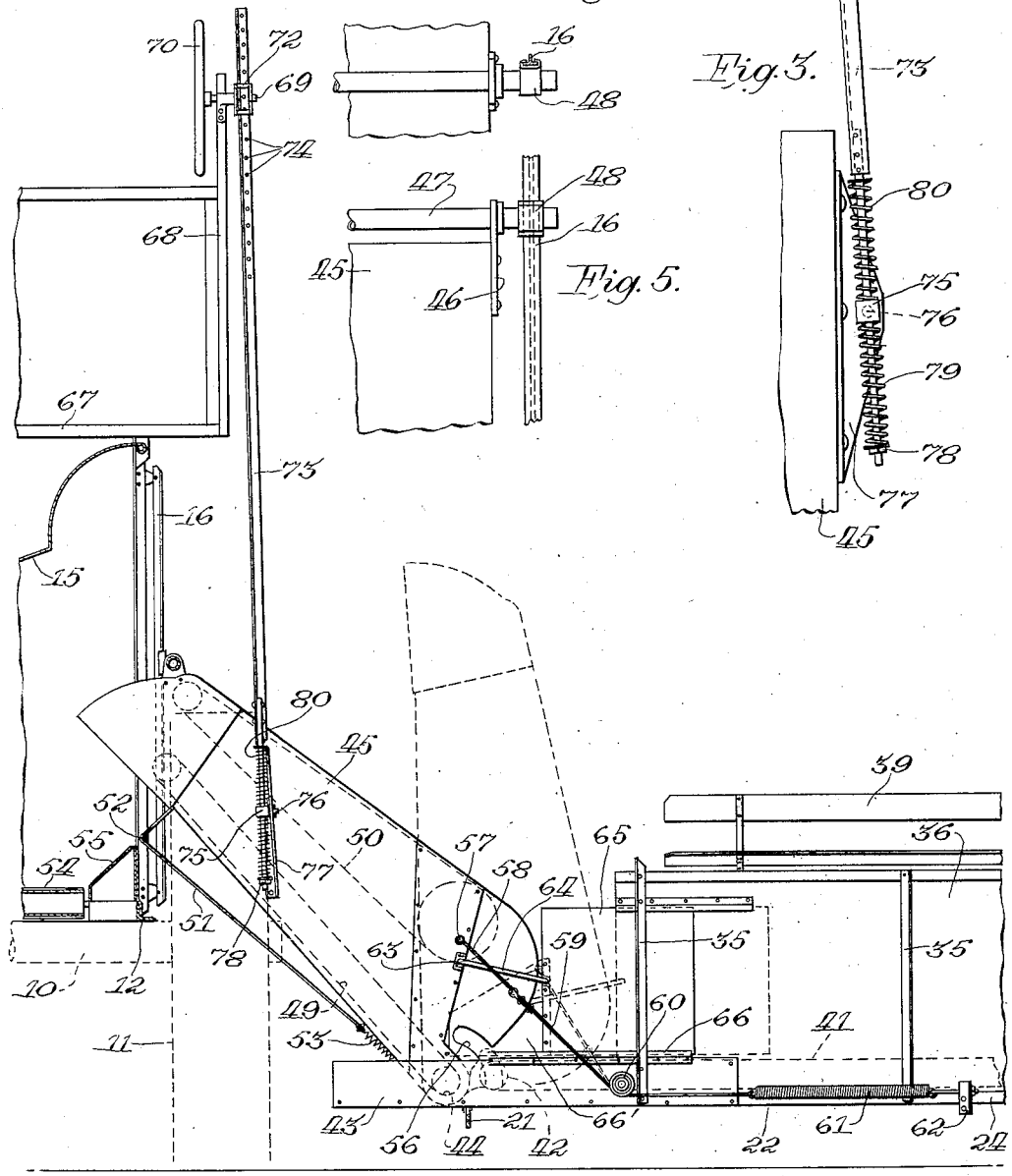
Inventor
Albert B. Welty Patented Sept. 24, 1935

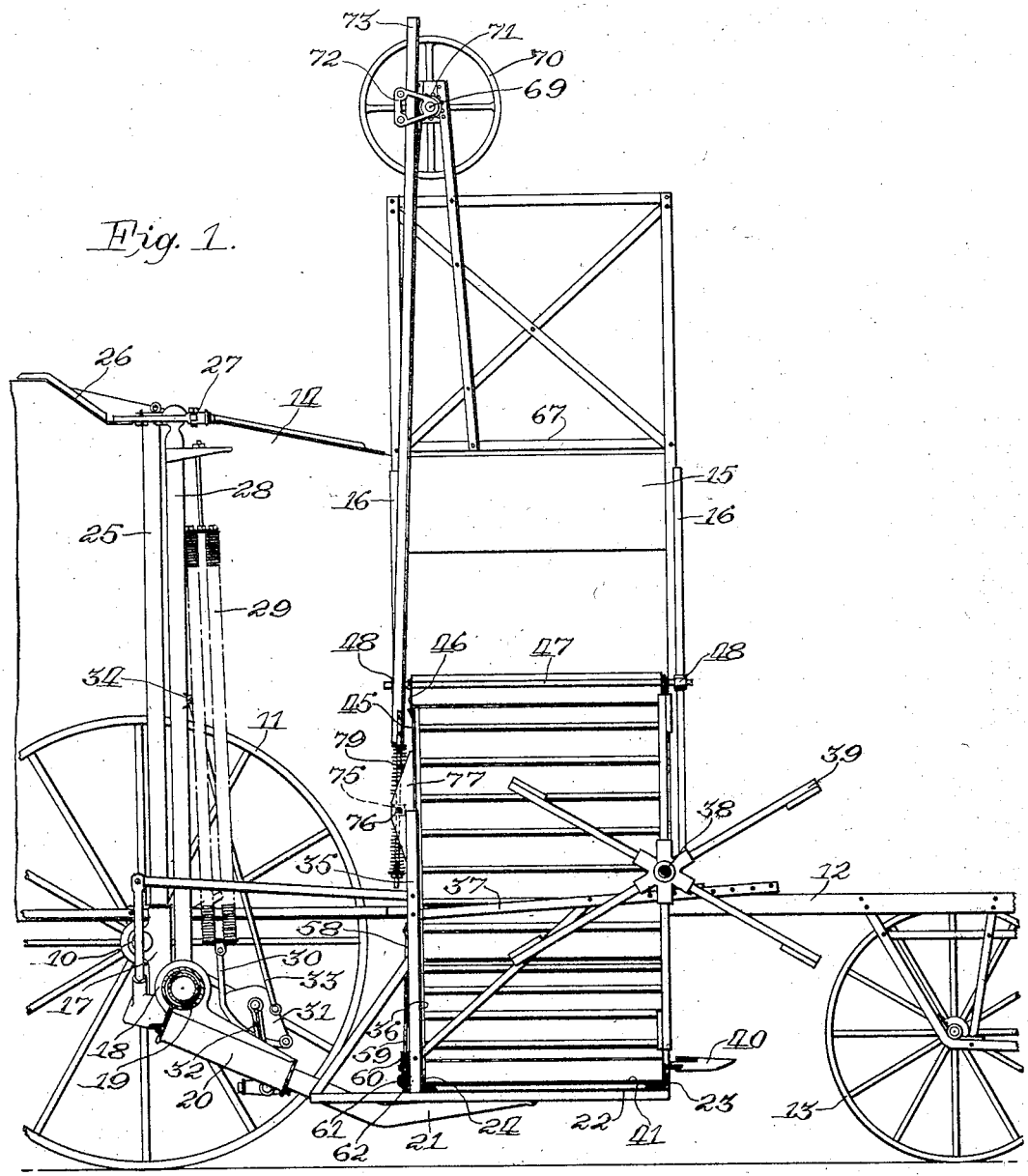

2,015,575

UNITED STATES PATENT OFFICE 2,015,575

HARVESTER

Albert B. Welty, Moline, Ill., assignor to International Harvester Company, a corporation of New Jersey Application June 29, 1934, Serial No. 733,003

17 Claims. (Cl. 56—122)

The invention relates to harvesters. More particularly it has to do with certain improvements in harvester threshers, such for example as the provision of a novel lifting means for raising and lowering the harvester platform; and an improved structure for associating the said platform and the elevator that elevates the cut grain from the platform into the thresher feed house in advance of the separator.

The main object of the invention is to provide an improved adjusting means for raising and lowering the platform.

Another object is to provide an improved means for operatively associating the discharge end of the platform with the elevator.

Other objects will become apparent to those skilled in this art as the disclosure is more fully made.

These desirable objects are attained by the example of the invention herein selected for the purposes of disclosure in which the harvester thresher embodies the usual thresher to which is removably and adjustably connected a harvester platform including an elevator pivotally connected to the discharge end thereof. This elevator discharges the cut grain into a feeder house in advance of the thresher, there being an operator's station on said feed house including a tiller wheel that operates a substantially vertically disposed rack. Said rack has its lower end connected in a novel way to the elevator, so that in this construction it is the elevator that is raised and lowered, the platform, of course, moving with it. The connection of the rack bar to the elevator includes a cushion to minimize shock and vibration.

The elevator has its discharge, or upper end, slidably guided and connected to appropriate rails adjacent the feeder house opening and, to prevent the elevator from cramping and binding in its up and down movement during adjustments of the platform, a novel counterbalance spring arrangement is connected between the elevator and platform to relieve such cramping and binding tendencies. A sliding gate or shield is also provided between the elevator and platform to keep the space between the rear side of the elevator and platform backboard closed, as the elevator and platform, because of their hinged connection, move relatively to one another.

Lastly, the elevator also carries a novel curtain, or flexible shield, to keep the space below the elevator in the feed house opening automatically closed as the elevator raises and lowers, to prevent loss of grain.

In the accompanying sheets of drawings,—

Figure 1 is a general side elevational view of a fragment of the harvester thresher, looking from the harvester side, to show the improved harvester adjusting means, the outer end of the platform being cut off;

Figure 2 is a rear elevational view showing a cross section through the feed house and the harvester minus its axle support;

Figure 3 is an enlarged side elevational detail view showing the cushioned connection of the lower end of the lift rack to the elevator;

Figure 4 is a detail plan view of the guide connection between the elevator and an edge of the feeder house opening; and, Figure 5 is an elevational view of the same detail, looking from the harvester side.

The harvester thresher shown comprises a transverse axle 10 carried in a pair of main wheels, one of which is shown at 11. In the usual way, this axle carries a longitudinal frame 12 having its forward end mounted on a steering wheel truck 13. This frame in the conventional manner carries a thresher, or separator housing 14 and, in advance thereof, a feeder house 15 having its grainward side open. Each side edge of this opening carries a vertical T-rail 16.

The grainward end of the thresher axle 10 is extended beyond the wheel 11 shown to carry a bracket 17 to which in turn is connected a bracket 18 that removably connects a harvester axle 19 to the thresher part. The bracket 18 includes an arm 20 for mounting a forwardly extending line lever 21 that supports a platform 22 bounded at its front edge by the usual transverse Z-bar 23 and at its rear edge by the angle bar 24.

The bracket 17 carries a post 25 held in place to the thresher at its upper end by a brace 26. This upper brace structure includes a plate 27 for releasably carrying the upper end of a standard 28 having its lower end carried suitably in the bracket 18. This standard 28 carries a battery of substantially vertically disposed counterbalance springs 29 connected at their lower ends to a flexible element 30 trained under and anchored to a cam 31. Said cam 31 is swingably and pivotally carried in upright arms 32 connected in turn to the bracket 20. A chain 33 is connected to the cam 31 and to the standard 28 at 34. The counterbalance structure per se forms no part of the present invention and serves to counterbalance the weight of the platform 22 and associated parts in the usual way.

The angle bar 24 carries several uprights 35 for mounting a backboard 36. This structure carries several frame pieces 37 for mounting a reel shaft 38 and reel 39. The Z-bar 23 carries the usual guards 40 of a cutting mechanism. A platform conveyer 41 is mounted on the platform 22 in the usual way. This endless conveyer passes around a roller 42 at its stubbleward end, said roller being carried on the usual shaft, not shown, mounted in a frame plate 43 secured to the angle bar 24 and backboard 36.

The plate 43, and a similar one at the front, not shown, carry a roller 44 and pivoted concentrically therewith is an elevator, or spout 45 extending upwardly and normally inclined toward the feeder house 15, as shown. As shown in Figures 2, 4 and 5, each side of the elevator near its upper end carries a bracket 46 for mounting a longitudinal shaft 47, said shaft at its ends carrying channel guides 48 fitting slidably on the T-rails 16 heretofore described. In this fashion the discharge end of the elevator moves slidably up and down in the feed house opening to discharge the elevated grain into the feeder house 15.

The roller 44 is part of an endless elevator conveyer 49 carried in the elevator 45. An upper conveyer 50 is also mounted in the elevator, it being understood that the cut grain received from the platform conveyer 41 is elevated upwardly into the feeder housing between said two conveyers 49, 50, as is common in this art.

The elevator 45 has connected to it near its upper end a curtain 51, which is passed over a rod 52 fixed across the feeder house opening near its bottom, as shown in Figure 2, said curtain having a spring 53 connected to its lower end, which spring in turn is deadened at any suitable point adjacent the lower end of the elevator. The feeder 15 has the usual conveyer 54 on its bottom running between troughed sides 55, one of which is shown. As the discharge end of the elevator spout 45 raises or lowers on its guide rails 16, the curtain 51 moves with it, the portion of the curtain 51 above the rod serving to direct the discharging grain properly into the feed house 15 without wasting or spilling out below the elevator.

The sides of the elevator 45 adjacent their lower edges are formed with an arcuate slot 56 concentric about the pivot of the elevator on the axis of the roller 44, so that, when the elevator is disconnected from the feeder house and folded to the upright dotted line position shown in Figure 2, the sides will fold properly without cramping, as the slots 56 pass over the shaft ends of the roller 42.

Connected at 57 to the side of the elevator 45, at a point well above the axis of the roller 44, is a rod 58 connected to a flexible element 59 trained around a roller 60 and running transversely behind and along the angle bar 24. The element 59 is connected to a transverse tension spring 61, which is secured to a clip 62, as shown. The spring exerts a pull that counterbalances the weight of the elevator 45 and thus relieves the load thereof on the guide rails 16.

Connected pivotally to the elevator sides at 63 is a transverse rod or link 64, also pivoted at its other end to a vertical slide gate 65 mounted slidably on a transverse guide rail 66 on the plate 43, as shown. The gate 65 has connected to its stubbleward end an extension 66' to insure at all times closing the space between the lower end of the elevator 45 and the gate 65. As the platform 22 is raised and lowered and the angle space between the pivotally connected platform and elevator changes, this side gate 65, 66' moves transversely to close the said angle space to prevent wasting of grain over the back side of the platform in a manner that will be obvious.

An operator's station 67 is located over the feed house 15, as shown, said station including a standard 68 carrying a shaft 69. On said shaft 69 is a hand, or tiller, wheel 70 and a pin wheel 71. Associated with the wheel 71 is a guide 72 for holding in engagement with the wheel 71 a vertical rack bar 73 having spaced holes 74 to mesh with the pin wheel 71. The lower end of this rack bar 73 is slidably carried in a block 75, as shown in Figure 3, said block having a pin 76 extending therefrom, which is pivotally carried in a bracket 77 secured to the rear side of the elevator 45. The lower end of the rack bar is formed as a rod, as shown, which extends some distance below the block 75, said rod at its lower end carrying a nut and washer 78 for seating a cushion spring 79 encircling the rod and abutting at its upper end against the block 75. Above the block 75 the rod is encircled by another spring 80, as shown. The lifting force transmitted from the wheel 70 through the bar 73 for adjusting the harvester platform to change the height of cut is thus applied directly to the elevator 45.

The use and operation of the parts will be clear, it is thought, in view of the above detailed description, but, summing up, the operator on his station 67, may operate the wheel 70 to move the rack bar 73 up or down, to adjust the level of the platform, said bar 73 being connected directly to the elevator 45. The springs 79, 80 act as cushions to lessen shock and vibration. The springs 29 counterbalance the weight of the harvester part during such adjustment to make this operation easy. As the elevator 45 moves up and down along its guide rails 16, the curtain 51 runs over the rod 52 to insure always that the grain will be properly directed into the feeder house 15. At the same time, the spring 61 is operative to counterbalance the weight of the elevator 45 and ease its weight on the rails 16. The slide gate structure 65, 66' makes certain that no grain will be spilled between the platform and elevator as the angle between these two parts varies as described.

When the harvester part comprising the axle 19 and all parts, such as the platform and elevator, are bodily disconnected from the thresher, as is the common practice when storing or transporting the machine, the elevator may be folded from the full line position shown in Figure 2 to the upright dotted line position shown. Of course, the guides 48 must first be separated in any desired way from the rails 16, when this is done. The spring 61 aids in tilting the elevator up into this position. The gate 65, 66' merely slides over, as indicated in the dotted lines in Figure 2, at such time. Any suitable form of stay brace, not shown, may be provided to hold the elevator in this folded position with respect to the platform.

It is the intention to cover all changes and modifications of the particular details of structure herein shown and described, which do not depart from the scope of the invention as indicated by the definitions thereof comprising the appended claims.

What is claimed is:

1. In a harvester, a body, a harvester adjustably connected thereto comprising a platform and an elevator, and means operable from the body and connected to the elevator for adjusting said harvester.

2. In a harvester, a body, a harvester adjustably connected thereto comprising a platform and an elevator, and means operable from the body and connected to the elevator for adjusting said harvester, said means comprising a substantially vertical bar connected at its lower end to the elevator.

3. In a harvester, a body, a harvester adjustably connected thereto comprising a platform and an elevator, and means operable from the body and connected to the elevator for adjusting said harvester, said means comprising a substantially vertical bar yieldingly connected adjacent its lower end to the elevator.

4. In a harvester, a body, a harvester adjustably connected thereto comprising a platform and an elevator, and means operable from the body and connected to the elevator for adjusting said harvester, said means comprising a substantially vertical bar pivotally connected adjacent its lower end to the elevator.

5. In a harvester, a body, a harvester adjustably connected thereto comprising a platform and an elevator, and means operable from the body and connected to the elevator for adjusting said harvester, said means comprising a substantially vertical bar yieldingly and pivotally connected at its lower end to the elevator.

6. In a harvester, a body, a harvester adjustably connected thereto comprising a platform and an elevator, an operator's station on the body, a vertical rack bar mounted adjacent the station and having its lower end connected to the elevator for raising and lowering the same with the platform, and means embodying a tiller wheel to operate the rack bar.

7. A harvester thresher comprising a thresher, a harvester including an elevator and platform associated with the thresher for up and down movement, means guiding the upper end of the elevator on the thresher, and means connected to the elevator for raising and lowering the harvester.

8. A harvester thresher comprising a thresher having a feeder housing, a harvester including a platform associated with the thresher for up and down movement, an elevator hingedly connected to the platform, means to guide the discharge end of the elevator on the feed housing, and means to counterbalance the weight of the elevator on said guide means.

9. A harvester thresher comprising a thresher having a feeder housing, a harvester including a platform associated with the thresher for up and down movement, an elevator hingedly connected to the platform, means to guide the discharge end of the elevator on the feed housing, and resilient means to counterbalance the weight of the elevator on said guide means.

10. A harvester thresher comprising a thresher having a feeder housing, a harvester including a platform associated with the thresher for up and down movement, an elevator hingedly connected to the platform, means to guide the discharge end of the elevator on the feed housing, and flexible means including a spring connected between the elevator and platform to counterbalance the weight of the elevator on said guide means.

11. A harvester comprising a platform, an elevator pivotally connected at one end thereof and normally extending at an inclination and endwise therefrom, means whereby said elevator may be folded to a position substantially at a right angle to the platform, and flexible means including a spring connected between the elevator and platform.

12. In a harvester, a platform, an elevator pivotally connected adjacent one end thereof and normally disposed at an angle with respect thereto, a vertical gate slidably mounted adjacent the angle between the elevator and platform, and means for shifting said gate as the angle between the platform and elevator changes.

13. In a harvester, a platform, an elevator pivotally connected adjacent one end thereof and normally disposed at an angle with respect thereto, a vertical gate slidably mounted adjacent the angle between the elevator and platform, and means connected between the gate and elevator for shifting said gate as the angle between the platform and elevator changes.

14. In a harvester thresher, a thresher including a feed housing, a harvester including an elevator associated with the thresher for up and down movement, said feed housing having an opening into which the discharge end of the elevator projects, a rod mounted across the lower end of said feed opening, a flexible curtain connected to the upper end of the elevator and trained over said rod, and means connecting the other end of the curtain to a point adjacent the lower end of the elevator.

15. In a harvester thresher, a thresher including a feed housing, a harvester including an elevator associated with the thresher for up and down movement, said feed housing having an opening into which the discharge end of the elevator projects, a rod mounted across the lower end of said feed opening, a flexible curtain connected to the upper end of the elevator and trained over said rod, means connecting the other end of the curtain to a point adjacent the lower end of the elevator, and means to keep the curtain taut.

16. In a harvester thresher, a thresher including a feeder housing, a harvester including a platform and elevator associated with the thresher for up and down adjustment, means to counterbalance the weight of the harvester, means to guide the elevator on the feeder housing, said elevator and platform being pivotally related, and means to counterbalance the weight of the elevator on said guide means.

17. In a harvester thresher, a thresher including a feeder housing, a harvester including a platform and elevator associated with the thresher for up and down adjustment, means between the thresher and harvester to counterbalance the weight of the harvester, means to guide the elevator on the feeder housing, said elevator and platform being pivotally related, and means connected between the elevator and platform to counter balance the weight of the elevator on said guide means.

ALBERT B. WELTY.